(12) United States Patent
Fischer

(10) Patent No.: US 6,419,067 B1
(45) Date of Patent: Jul. 16, 2002

(54) PRESSURE-MEDIUM-ACTUATED CLUTCH

(75) Inventor: Robert Fischer, Bühl (DE)

(73) Assignee: LuK Lamellen und Kupplungsbau Beteiligungs KG, Bühl (DE)

( * ) Notice: Subject to any disclaimer, the term of this patent is extended or adjusted under 35 U.S.C. 154(b) by 0 days.

(21) Appl. No.: 09/619,939

(22) Filed: Jul. 20, 2000

(30) Foreign Application Priority Data

Jul. 21, 1999 (DE) .......................................... 199 34 305

(51) Int. Cl.$^7$ ................................................ F16D 25/06
(52) U.S. Cl. ............................ 192/85 CA; 192/85 AA; 192/109 F
(58) Field of Search .................... 192/85 CA, 109 F, 192/85 AA

(56) References Cited

U.S. PATENT DOCUMENTS 4,942,787 A * 7/1990 Aoki et al. .......... 192/109 F X
6,285,942 B1 * 9/2001 Steinmetz et al. ... 192/109 F X
2001/0002642 A1 * 6/2001 Konrad .................. 192/85 CA

* cited by examiner

Primary Examiner—Saul Rodriguez
(74) Attorney, Agent, or Firm—Alfred J. Mangels

(57) ABSTRACT

A pressure-medium actuated clutch that includes a plurality of clutch disks and a piston slidably positioned for movement toward and away from the disk to selectively engage and to disengage the clutch. A pressure chamber is provided adjacent to the piston and communicates with a source of pressurized fluid. A pilot-pressure-operated control valve is provided to control the pressure of the pressurized fluid, and a flow constriction is provided in a conduit extending from the control valve to the pressure chamber. A method for actuating the clutch is also disclosed.

8 Claims, 3 Drawing Sheets

PRESSURE-MEDIUM-ACTUATED CLUTCH

BACKGROUND OF THE INVENTION

1. Field of the Invention

The present invention relates a pressure-medium-operated clutch, especially for the drive train of a motor vehicle. Additionally, the invention also relates to a method for operating such a clutch.

2. Description of the Related Art

Pressure-medium-operated clutches can be used, for example, as drive components for an automatic-transmission-equipped motor vehicle, such as is described in German Patent DE 198 00 490. The automatic transmission can be a multiple-stage automatic transmission or it can be a continuously variable transmission (CVT), such as a belt-driven, conical pulley transmission. Such a clutch can also be utilized in a manually-operated transmission.

Pressure-medium-operated clutches have the disadvantage that, beginning at an unpressurized state, a comparatively long time elapses before torque is transmitted, because the clutch-activation cylinder must first be filled to cause engagement. During that time period critical vehicle or safety conditions can arise.

A purpose of the present invention is to provide a clutch and a method to activate the clutch in order to provide improved safety.

The present invention solves the problems by means having the advantageous features hereinafter described.

SUMMARY OF THE INVENTION

Briefly stated, in accordance with one aspect of the present invention, a pressure-medium-actuated clutch is provided that includes an annular pressure plate slidably supported for movement toward and away from a plurality of clutch disks. The pressure plate includes a piston surface that is spring biased toward a disengaged condition of the clutch. A pressure chamber is formed adjacent to and facing the piston surface, wherein the pressure chamber is adapted to receive pressurized fluid to cause the piston surface and pressure plate to move toward an engaged condition of the clutch. A pressure-medium control system includes at least one pilot-pressure-controlled valve, wherein at the beginning of actuation with a substantially unpressurized clutch pressure chamber the chamber is filled more quickly at higher pressure. A control means is provided that is operable upon reaching one of a desired pressure in the pressure chamber and a predetermined time interval to fill the pressure chamber with fluid more slowly.

In accordance with another aspect of the present invention a method is provided for operating a pressure-medium-operated clutch, the method including providing a pressure-reducing valve between a clutch pressure chamber and a source of pressurized fluid. A pilot pressure applied to a valve member carried within the pressure-reducing valve is controlled to provide a desired clutch-operating pressure.

BRIEF DESCRIPTION OF THE DRAWINGS

The invention is further described herein in relation to the following drawings, in which.

DESCRIPTION OF THE PREFERRED EMBODIMENTS

Figure 1:
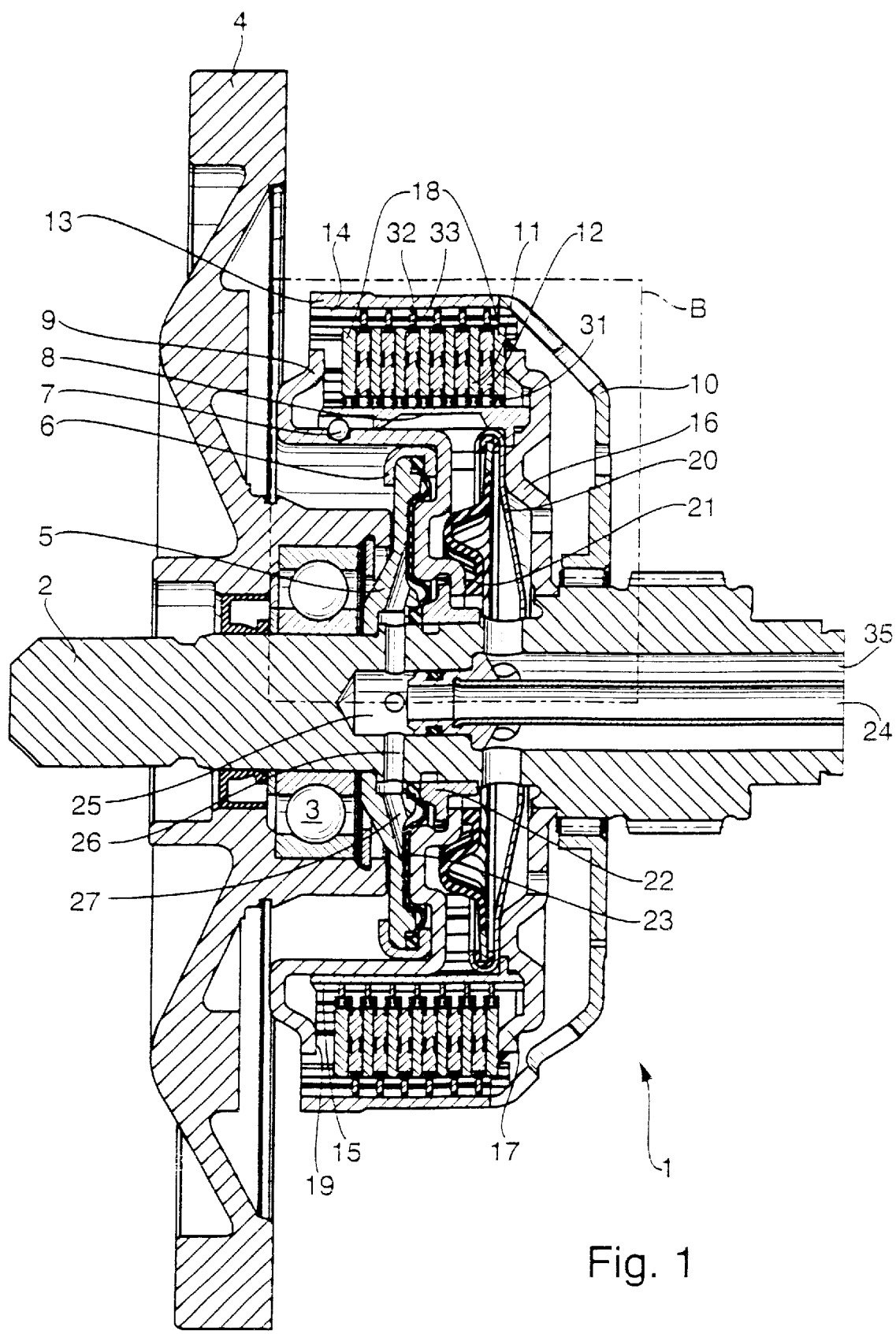
FIG. 1 is a cross-sectional view of a clutch in accordance with the present invention.

FIG. 1 is a cross-sectional view of an embodiment of a multiple-disk clutch 1. At the input side of multiple-disk clutch 1 a shaft 2 (only partially shown in FIG. 1) is provided that is also connected with a set of planetary gears (not shown) or with a set of conical drive elements (not shown). Shaft 2 is rotatably supported in a housing by means of a first roller bearing 3 and by a second roller bearing (not shown). FIG. 1 shows only cover 4 of the housing The-multiple-disk clutch can be provided with a further, reverse clutch that in conformity with German patent publication DE 198 00 490 can be radially positioned outside clutch 1. The invention further relates to a clutch as disclosed in the earlier German patent publication DE 19 800 490, the entire contents of which is hereby expressly incorporated herein by reference to the same extent as if fully rewritten.

Supported on shaft 2 and axially adjacent to roller bearing 3 is an annular flange 5 that carries at its outer periphery a sheet metal component 6 that has a U-shaped cross section. Reference numeral 7 designates a ball that is carried in an axial slot to serve as a positive drive and to allow an inner disk carrier 8 to move axially, but not radially, relative to a pressure plate 9. Pressure plate 9 can also be referred to as a piston.

The outer region of the multiple-disk clutch is surrounded by a clutch casing 10 that encloses inner disks 11 and outer disks 12. Casing 10 also forms an outer disk carrier 13 that is positioned radially outwardly of outer disks 12 and that includes axially-extending teeth 14. In a similar manner, inner disks 11 are carried on axially-extending external teeth 15 of inner disk carrier 8 for axial movement therealong.

An annular hub 16 carries an engagement surface 17 in such a manner that inner disks 11 and outer disks 12, which are arranged between a pair of end disks 18, can be driven between engagement surface 17 and a corresponding engagement surface 19 on pressure plate 9 for purposes of torque transmission upon the application of a perpendicular force.

Illustrated in FIG. 1 by reference numeral 20 is an oil partition, which at its radially outermost edge overlaps the outer edge of a plate spring 21. A thrust ring 22 carried on the outer circumference of shaft 2 serves as an axial support for an adjacent membrane 23 that is shown more clearly in FIG. 2.

Pressurized hydraulic fluid can be supplied from a pump (not shown) through a conduit 24 that is either positioned within or that is formed in shaft 2. After passing through conduit 24, the hydraulic fluid reaches an end area 25 in shaft 2, from which a radial conduit 26 branches. The pressurized hydraulic fluid flows through conduit 26 and into a first pressure chamber 27 bounded by annular flange 5 and membrane 23, and when within chamber 27 the fluid exerts pressure against membrane 23. The surface of membrane 23 that faces in the opposite direction from first pressure chamber 27 rests against a piston 28, which faces the active face of plate spring 21, against which piston lies an annular seal 29 which, in turn, presses against the active face of plate spring 21.

First pressure chamber 27 together with pressure plate 9 forms a piston/cylinder unit to actuate the clutch. A pressure increase in first pressure chamber 27, caused by the pressurized fluid introduced into chamber 27, causes membrane 23 and piston 28 to move to the right, as viewed in the plane of the drawing, against the biasing force of plate spring 21. Piston 28 is integral with pressure plate 9 so that when first pressure chamber 27 is initially pressurized, there is also a displacement toward the right, when viewed in the plane of the drawing, of engagement surface 19 of pressure plate 9, and consequently disks 11, 12, and 18 come into contacting engagement. Because the structure of membrane 23 includes two circular troughs 30, similar to rolled creases, and because membrane 30 is a thin element, pressurizing first pressure chamber 27 results in a substantially friction-free and consequently a hysteresis-free actuation of piston 28.

Figure 2:
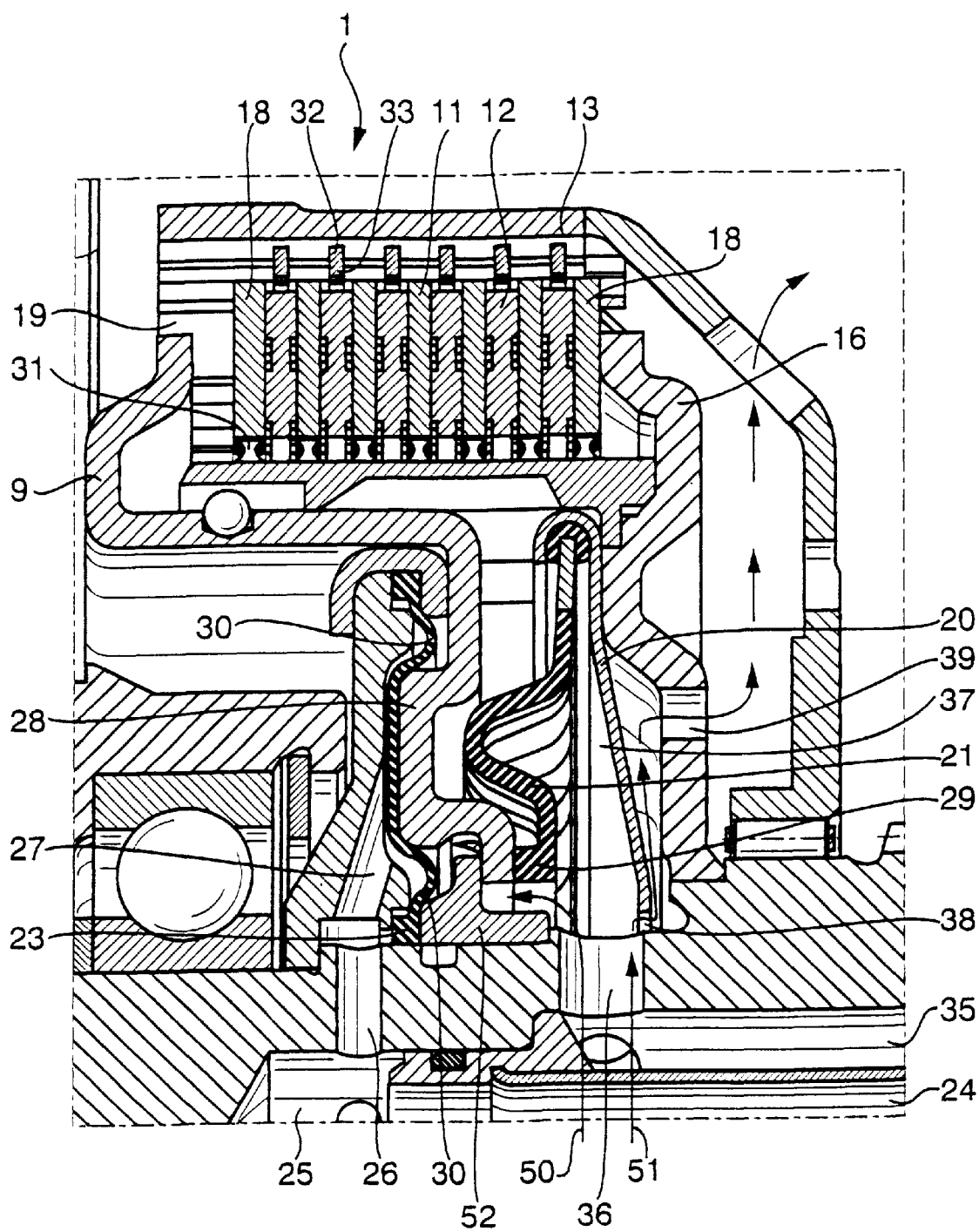
FIG. 2 is an enlarged view of detail "B" of the multiple-disk clutch shown in FIG. 1.

As a result, even a slight change in the pressure in first pressure chamber 27, acting on membrane 23, provides a substantially friction-free, axial displacement of piston 28, and thereby of engagement surface 19 of pressure plate 9 and of disks 11, 12, and 18. It should be noted in this respect that multiple-disk clutch 1 is shown in FIG. 2 as open, and therefore engagement surface 19 has not yet contacted end disk 18. It is evident that upon a further increase in the pressure within first pressure chamber 27 there will be a corresponding displacement of piston 28, and hence of engagement surface 19, causing a corresponding perpendicular reaction force between inner disks 11 and outer disks 12. A slight pressure change within first pressure chamber 27 for the purpose of regulating the torque transmitted by multiple-disk clutch 1, within the range of regulation of about 1/10 the possible path of displacement of disks 11, 12, and 18, results in a commensurately small axial displacement of the disks along axially-extending teeth 14, 15 of disk carriers 8, 13.

When a slight change in the torque transmitted by multiple-disk clutch 1 is desired, it can be implemented by means of a control for slightly changing the pressure of the pressurized fluid fed into first pressure chamber 27, whereby a corresponding slight axial displacement of inner disks 11 and outer disks 12 is carried out by slight movement of membrane 23, piston 28, pressure plate 9 and engagement surface 19. As a result, inner disks 11 and outer disks 12, by virtue of complementary spring tongues 31, 32 that engage with respective axially-extending teeth 14, 15, non-rotatably engage inner disk carrier 8 and outer disk carrier 13. The slight pressure change in first pressure chamber 27 and the resulting slight axial displacement of the disks results in a change in the normal force between the disks, without spring tongues 31, 32 that engage axially-extending teeth 14, 15 being displaced in the direction of the teeth, so that a desired, slight change in torque no longer causes relative displacement between the side flanks 33 of spring tongues 31, 32 and axially-extending teeth 14, 15.

In operation, multiple-disk clutch 1 is subjected to rotary motion, so that pressure fluid that is introduced into pressure chamber 27 through conduit 24 is likewise subjected to rotary motion. As a result of the circulation of the pressure fluid, from which circulation first pressure chamber 27 is supplied, fluid can similarly be supplied to fluid chamber 37, through a conduit 35 within the output shaft and that is coaxial with conduit 24, and through a conduit 36 connected with conduit 35. Fluid is introduced through an opening 38 in the radially-inwardly-lying portion of oil divider 20 as well as through an opening 39 in hub 16, so that the fluid can arrive in the area of disks 11, 12, 18 and can be introduced to provide cooling because of the heat resulting from the frictional engagement between the disks.

The oil flow takes place in such a way that the oil that flows through bore 36 as a result of clutch engagement can be guided to multiple-disk clutch 1, or upon disengagement of the clutch it can be guided to a radially-outwardly-lying reverse-movement clutch or diverted. Correspondingly, based upon the position of pressure plate 9 the fluid is led in the direction of arrow 51 through bores in portions 20 and 16 and 13. Portion 20 thereby carries a relatively small bore.

With pressure plate 9, 28 in engagement with the clutch disks, a radially inward passageway is opened between pressure plate 28 and thrust ring 22, as a result of which the passageway is further enlarged radially outwardly and is larger than bore 38 in portion 20. Thus the fluid flows in the direction of arrow 50 into clutch 1.

Figure 3:
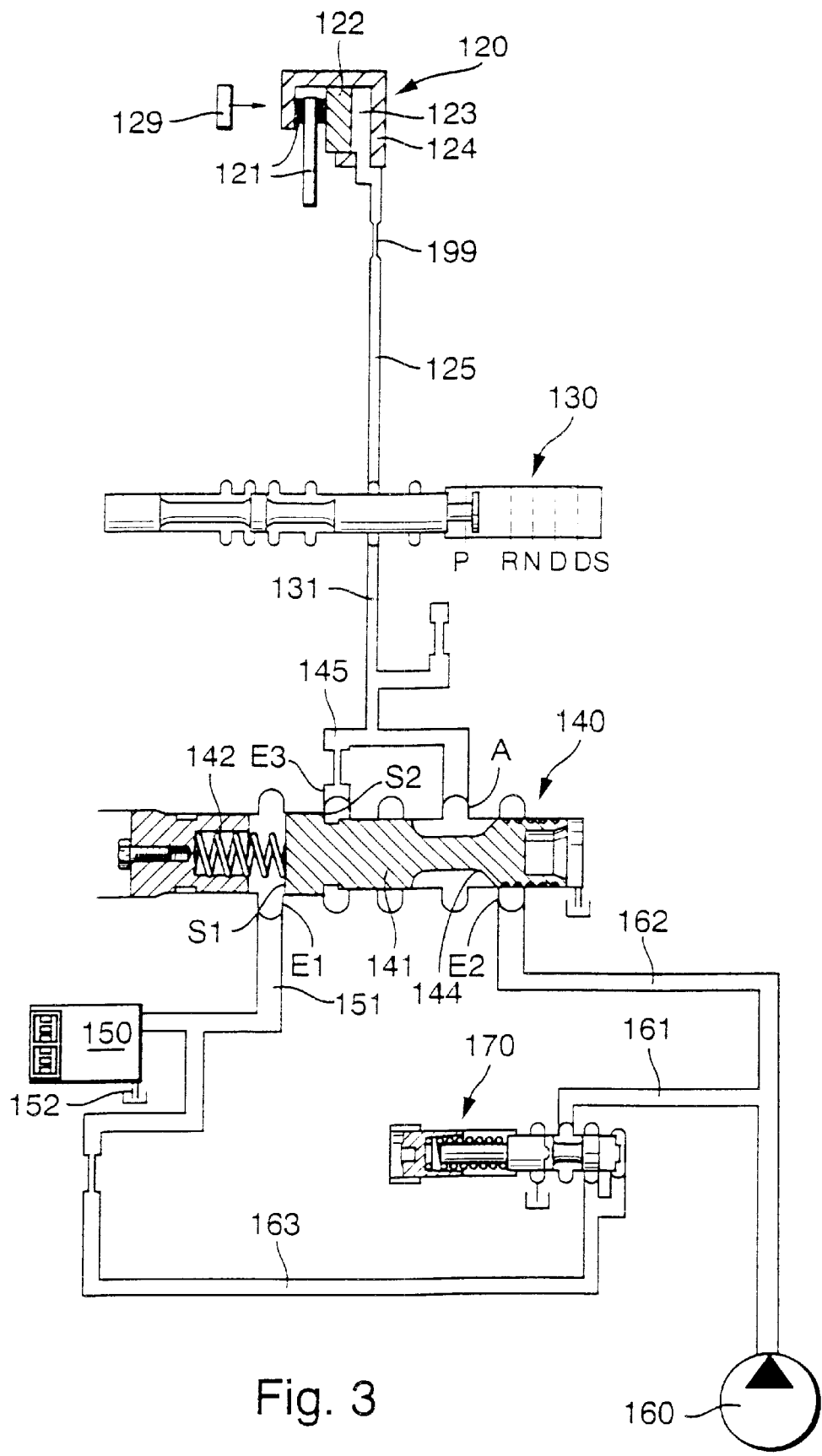
FIG. 3 shows an hydraulic system for operating the clutch.

In FIG. 3 the clutch is identified by reference numeral 120. Conventionally, clutch 120 includes a set of disks 121 and a piston 122 that is movable inwardly in a chamber 123 within a cylinder 124 by means of hydraulic pressure, to engage the clutch in such a way that piston 122, upon enlargement of chamber 123, presses the disks of the set of disks 121 against a corresponding friction lining. The higher the pressure within chamber 123, the larger the coupling torque transferred by driving clutch 120.

Chamber 123 is connected through a hydraulic conduit 125 with a manually-movable valve 130 which, for safety, abruptly empties chamber 123 when switching into to the P and N positions. In the D position conduit 125 communicates with conduit 131 which, in turn, communicates with a pressure-reducing valve 140 positioned after manually-movable valve 130. The pressure-reducing valve includes an inlet E1 to receive pilot pressure and an inlet E2 to receive the full system pressure provided by a pump 160 through a conduit 162, as well as an inlet E3 described further below, and an outlet A connected to conduit 131 to provide the clutch operating pressure.

Inlet E1 communicates through a conduit 151 with an electromagnetic valve 150, such as a control valve or a proportional valve, which is controlled by a control unit (not shown) for regulating the level of current flowing in the valve's magnet in order to set the pilot pressure at inlet E1. The pressure produced by pump 160 is applied through conduit 161 to a pressure-reducing valve 170 that provides a constant pressure of, for example, 5 bar to conduit 163, which pressure is utilized by control valve 150 to provide, according to its setting, the pilot pressure at inlet E1.

Control valve 150 produces a downstream flow that is dependent upon the pressure provided by pressure reducing valve 170 (for example 5 bar) to control the pilot pressure (for example 0 to 5 bar) at inlet E1. The flow is used as a set point for the clutch pressure, preferably using software and by means of parameters such as, for example, throttle-valve position, etc. Depending on the plunger position of control valve 150, the pressure from pressure reducing valve 170 present at inlet E1 is maintained constant by fluid discharge through the outlet to sump 152 so that the pilot pressure corresponds with the set point.

Pressure-reducing valve 140 includes a valve spool 141. In accordance with the invention, spool 141 is biased toward the right, as viewed in FIG. 3, by a spring 142, preferably in the form of a coil spring. Spring 142 presses against an end face S1 of spool 141. As a result, and before valve spool 141 reaches its end position, control edge 144 of valve spool 141 is shifted toward inlet E2 so that the system pressure is communicated from inlet E2 to outlet A and passes through a feedback branch 145 to inlet E3, where it exerts on control surface S2 a pressure opposite to the force of spring 142, whereby valve spool 141 is shifted so far to the left until communication between control edge 144 and inlet E2 again is interrupted. The pressure acting on clutch 120 is therefore related to the combination of the pressure from spring 142 plus the pilot pressure at inlet E1.

The method of operation of the described control arrangement will now be explained in further detail. The clutch pressure need not be controlled very precisely during the time chamber 123 of drive clutch 120 is being pre-filled or emptied. No torque is being transmitted at those times. Hence pressure-reducing valve 140 is only biased by spring 142 so that the minimal clutch pressure in chamber 123 corresponds with the pressure exerted by plate spring 21. In that case the pilot pressure set by control valve 150 is zero.

During normal vehicle operation, by appropriate operation of control valve 150 to engage drive clutch 120, the pilot pressure at inlet E1 is raised from zero in such a way that spool 141 in pressure-reducing valve 140 is shifted in such a manner that the full system pressure applied to inlet E2 consistent with the pressure exerted by spring 142 plus the pilot pressure, is transmitted to clutch 120. As soon as the desired clutch pressure has been attained, the force applied to control surface S2 through feedback branch 145 interrupts the connection between inlet E2 and outlet A. In that way the pilot pressure can immediately be used to transmit a torque. When engaging the clutch or accelerating, no time will be wasted, as would be needed to fill space 123 using the state-of-the-art apparatus.

Also during normal vehicle operation, because of the effect of spring 142 the clutch pressure is decreased to the pressure needed to transfer a creeping torque (creeping pressure) due to the effect of spring 142, which is in the range of the biasing force of the plate spring.

In order to adjust the torque to be transmitted by the clutch, an estimated torque is selected. The pressure through proportional valve 150 is adjusted according to a characteristic curve stored in a computer unit. For that purpose the proportional valve is provided with a current i to operate the valve to set the nominal pressure. An objective of the invention is to set, for a first time interval, a current that is substantially higher than that necessary to provide the input torque. As a result, the area of conduit 125 upstream of constriction 199 is subjected to a higher pressure and thus chamber 123 fills more quickly. When the nominal pressure in chamber 123 is at least nearly reached, the current is switched back to the value i corresponding with the nominal pressure to control proportional valve 150. This switchover to the lower current also can take place after a given time interval has elapsed.

The current setting to rapidly fill the cylinder can be determined by various parameters such as temperature, angular speeds of motor and gears, vehicle speed, or throttle-valve position.

The clutch pressure can be detected by a pressure sensor.

The claims included in the application are illustrative and are without prejudice to acquiring wider patent protection. The applicant reserves the right to claim additional features disclosed in the specification and/or drawings.

The references contained in the dependent claims point to further developments of the object of the main claim by means of the features of the particular claim; they are not to be construed as renunciation to independent, objective protection for the features of the related dependent claims.

The objects of the dependent claims also constitute independent inventions comprising a structure independent of the object of the previous dependent claims.

The invention is also not restricted to the description of the illustrative embodiments. On the contrary, many changes and variations are possible within the scope of the invention, in particular such variants, elements, and combinations and/or materials which, for example, are inventive by combining or modifying features, or elements, or method steps described individually in relation to the general specification and embodiments and claims and shown in the drawings, and which by means of combined features lead to a new object or new method steps or sequences of method steps, as well as manufacturing, testing and operational procedures.

What is claimed is:

1. A pressure-medium-actuated clutch comprising: an annular pressure plate slidably supported for movement toward and away from a plurality of clutch disks, the pressure plate including a piston surface that is spring biased toward a disengaged condition of the clutch; a pressure chamber formed adjacent to and facing the piston surface, wherein the pressure chamber is adapted to receive pressurized fluid to cause the piston surface and pressure plate to move toward an engaged condition of the clutch; a pressure-medium control system including at least one pilot-pressure-controlled valve, wherein, at the beginning of actuation with a substantially unpressurized pressure chamber the chamber is filled more quickly at higher pressure; and control means operable upon reaching one of a desired pressure in the pressure chamber and a predetermined time interval to fill the pressure chamber with fluid more slowly, wherein the pressure plate includes a generally radially-extending pressure surface and an annular wall member extending axially, an inner clutch disk carrier surrounding the annular wall member, and a bearing carried between the annular wall member and the disk carrier to minimize frictional resistance to axial movement of the pressure plate.

2. A pressure-medium-actuated clutch in accordance with claim 1, including a flow constriction positioned between the pressure chamber and the pressure-medium control system.

3. A pressure-medium actuated clutch in accordance with claim 2, wherein the pressure in the pressure chamber is set by a proportional valve.

4. A pressure-medium-actuated clutch in accordance with claim 1, wherein the bearing is a ball bearing.

5. A pressure-medium-actuated clutch in accordance with claim 4, wherein the clutch disk carrier includes a plurality of axially-extending grooves that define a bearing track, and wherein the bearing is carried in a recess formed in the annular wall member and radially opposite the bearing track.

6. A pressure-medium-actuated clutch in accordance with claim 5, wherein the bearing track is defined by a pair of circumferentially-spaced, axially-extending teeth.

7. A pressure-medium actuated clutch in accordance with claim 1, wherein the valve includes a valve spool having a control surface against which fluid pressure acts to provide a force in opposition to a pilot pressure force.

8. A pressure-medium-actuated clutch in accordance with claim 7, wherein the valve includes a feedback loop for conveying valve outlet pressure to the control surface.

* * * * *